Nov. 30, 1954 K. K. MADISON ET AL 2,695,424
THIN WALLED CURING BAG
Filed Dec. 17, 1951 2 Sheets-Sheet 2

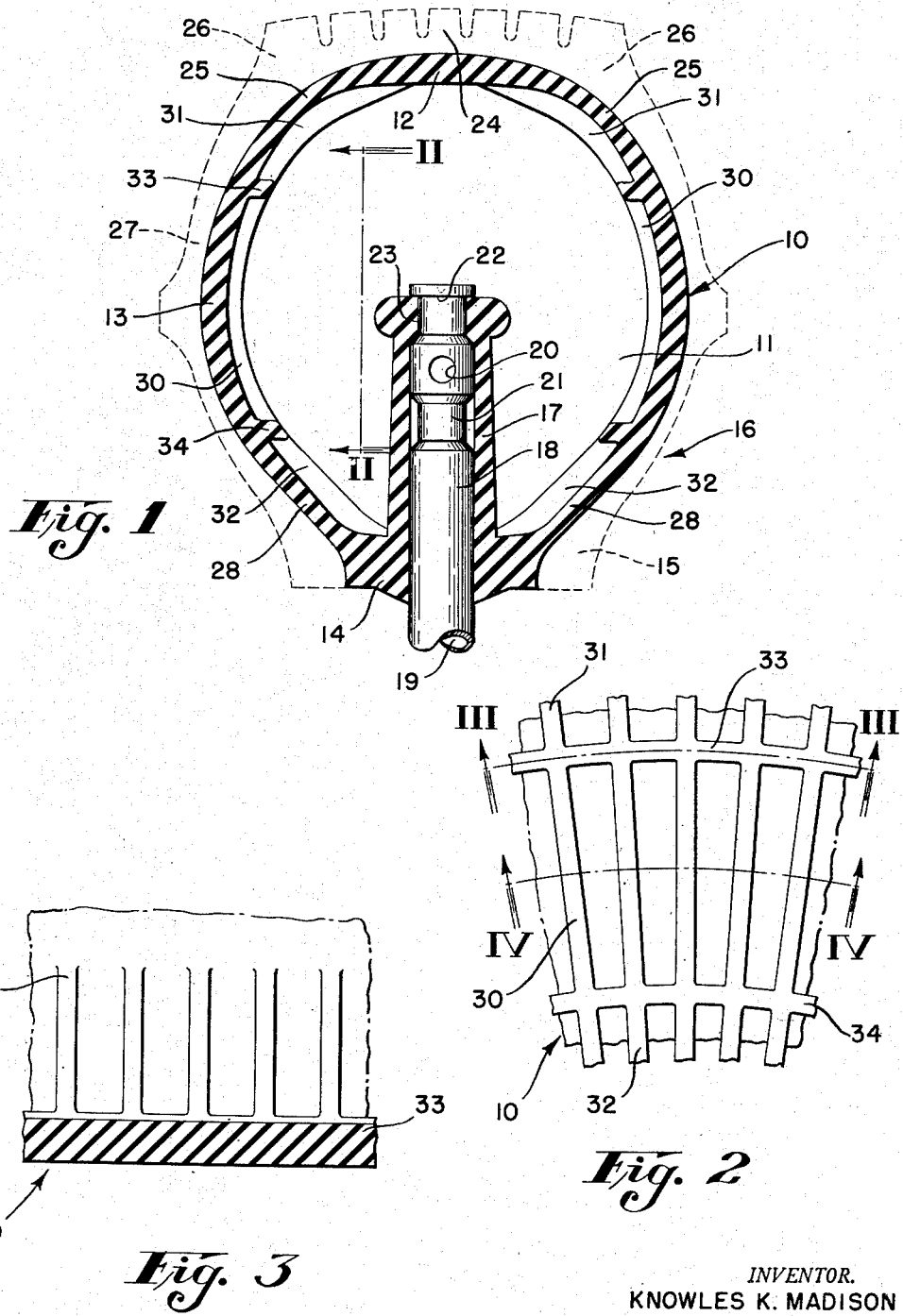

INVENTOR.
KNOWLES K. MADISON
BY ARTHUR W. BULL
ANTHONY J. SAULINO
James J. Long
Agent 2,695,424
Patented Nov. 30, 1954

2,695,424

THIN WALLED CURING BAG

Knowles K. Madison, Detroit, Arthur W. Bull, Grosse Pointe, and Anthony J. Saulino, Detroit, Mich., assignors to United States Rubber Company, New York, N. Y., a corporation of New Jersey Application December 17, 1951, Serial No. 262,036

5 Claims. (Cl. 18—45)

This invention relates to an improved curing bag for manufacturing pneumatic tires, and more particularly it relates to a curing bag that provides for efficient heat transmission, while having adequate rigidity and strength to support a tire casing being shaped and cured thereon.

The improved curing bag of the instant invention is characterized by a structure calculated to provide maximum strength and rigidity, while at the same time providing for rapid transmission of heat to the tire casing.

A principal object of the invention is to provide an improved curing bag that is capable of positively maintaining the form of the tire casing that is shaped and cured on the bag.

Another object is the provision of a curing bag that is capable of being used repeatedly a great number of times, without producing defective tires by reason of failure of the bag to support the tire casing.

Still another object of the invention is to provide a curing bag that transmits heat to the tire casing in the shortest possible time.

A further object is to provide a curing bag which employs a minimum amount of material, but distributes the material in a manner providing optimum rigidity and strength.

Still a further object of the invention is the provision of a curing bag that makes possible uniform curing of all parts of the tire.

An additional object of the invention is to provide an improved curing bag that offers great resistance to crushing and kinking forces exerted on the bag by the raw tire casing mounted thereon.

The manner in which the invention accomplishes the foregoing objects and advantages, as well as additional objects and advantages, will be made manifest in the following detailed description, which is intended to be read with reference to the accompanying drawings, wherein:

Fig. 1 is a transverse sectional elevation of a curing bag constructed according to the invention, disposed within a pneumatic tire casing shown in outline;

Fig. 2 is a fragmentary elevational view of a portion of the interior side wall of the curing bag, taken along line 2—2 of Fig. 1;

Figure 5:
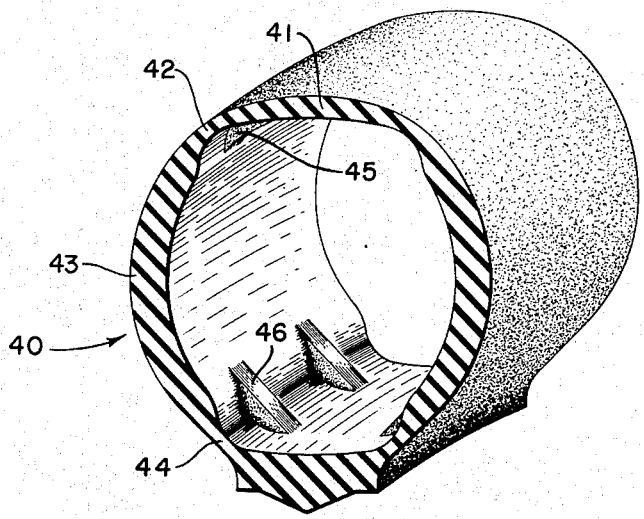
Figure 4:
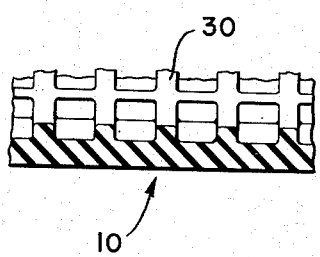
Figure 6:
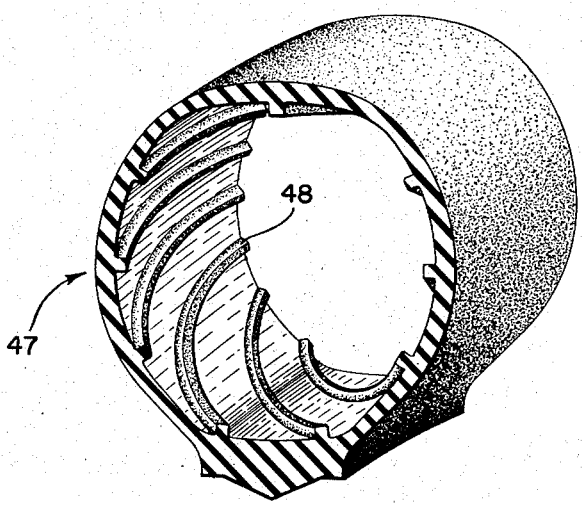

Figs. 3 and 4 are fragmentary longitudinal sectional views of the bag taken along lines 3—3 and 4—4, respectively, of Fig. 2; and, Figs. 5 and 6 are fragmentary perspective views of modifications of the invention.

Referring to the drawings, the embodiment of the invention shown in Figs. 1 to 4 comprises a curing bag 10 of annular toroidal form, and having a hollow interior 11 adapted to contain a fluid shaping and heating medium under pressure, such as hot water or steam. The bag 10 is made of extensible resilient material, usually butyl rubber. The bag 10 is comprised essentially of an upper or crown portion 12, sidewall portions 13, and a base or toe portion 14. The base portion 14 is relatively thick and rigid and is designed to impart the desired shape to the bead areas 15 of a pneumatic tire casing 16 in which the bag is mounted, in cooperation with the toe ring members (not shown) of the vulcanizing mold in which the tire is cured by application of heat. The external surface of the curing bag has a contour corresponding to the desired internal contour of the tire casing 16. The curing bag may be associated with the tire casing with the aid of a vacuum shaping box (not shown) which initially receives the raw tire casing in the form of an essentially cylindrical flat band as removed from the tire building drum. In the vacuum box the curing bag is inserted into the interior of the casing band and inflated with fluid, while vacuum is applied to the exterior of the casing to shape the casing in annular toroidal form around the bag. The operation of inserting the bag into the casing requires rough handling of the bag, including severe twisting thereof, and rough pushing of the bag into place within the casing.

A resilient tube-like sealing stem 17 projects inwardly into the interior of the curing bag and serves to receive a rigid insertable connecting tube 18, having a longitudinal passageway 19 terminating in radial inlet openings 20 by means of which fluid passes into the interior of the bag when the rigid tube 18 is inserted far enough into the resilient stem 17 to place the inlet openings 20 within the cavity 11. The rigid insertable tube 18 is provided toward its inner end with two spaced annular recesses 21 and 22 disposed at each side of the radial openings 20 and adapted to selectively engage an interior annular sealing projection 23 at the end of the resilient stem 17. When the recess 22 located nearest the end of the tube 18 is in engagement with the sealing projection 23, the openings 20 are located on the inside of the resilient stem 17, as shown in Fig. 1, and are thereby sealed off from communication with the cavity 11 of the bag 10. In this position the solid end of the tube 18 serves as a plug or seal against passage of fluid into or out of the bag cavity. When the insertable tube 18 is pushed further into the stem 17 so that the recess 21 located at the other side of the openings 20 is in engagement with the sealing projection 23, then the openings 20 are exposed in the interior of the curing bag 10, and in this position the tube 18 serves for entrance or removal of fluid from the bag. Curing bag connecting means of this type is described more fully and claimed in the copending application of Joseph C. Andreini, Serial No. 198,135, filed November 29, 1950, and assigned to the same assignee as the instant application.

The various wall portions of the bag 10 are preferably so proportioned that the amount of heat transmitted from the heating fluid in the cavity 11 of the bag will be in substantially direct proportion to the bulk of the tire casing disposed adjacent such portions of the bag. This insures that the thicker portions of the tire casing, which require a proportionately greater amount of heat to attain curing temperature, will receive proportionately greater heat from the heating fluid, while the thinner portions of the tire casing, which require proportionately less heat, will receive correspondingly less heat from the heating fluid. In this manner all parts of the tire casing will be heated to essentially the same temperature for essentially the same amount of time, and therefore the entire tire will be substantially uniformly cured. To this end, the crown portion 12 of the bag, which is disposed opposite the comparatively thin tread portion 24 of the tire casing, is made comparatively thick, compared to the shoulder portions 25 of the bag at either side of the crown 12, which are made comparatively thin to provide for greater passage of heat to the relatively thick shoulder portions 26 of the casing. Similarly, the side wall portions 13 of the bag are made comparatively thick compared to the shoulder portions 25, because of the relative thinness of the side wall 27 of the casing compared to the shoulder 26 of the casing. The portions 28 of the curing bag wall just above the bead areas 15 of the casing are made relatively thinner than the side wall portions 13 of the casing, because of the comparative thickening of the tire casing toward the beads 15.

In order to provide additional strength, the interior surface of the bag is formed with equally spaced reinforcing ribs 30 that extend along the wall of the bag radially of the major axis of the bag. The ribs 30 are made comparatively thicker, that is, they project a somewhat greater distance from the interior surface of the bag, at the portions 31 and 32 corresponding to the relatively thin shoulder portions 25 and bead portions 28 respectively, to provide maximum reinforcement at these points.

At the crown 12 and base portion 14 of the bag, where the walls of the bag are relatively thicker and more rigid, the reinforcing ribs 30 are gradually tapered off in thickness and terminated.

At each side wall portion 13 of the bag there are provided additional circumferentially extending reinforcing ribs 33 and 34 located toward the shoulder portion and toward the bead portion of the bag.

A principal advantage of this form of the invention is that it permits the walls of the curing bag to be made substantially thinner than has heretofore been considered practical, while still retaining the desired strength and rigidity. Because of the thinness of the walls of the bag it has been found possible to materially reduce the time required to cure a tire, with consequent appreciable savings in factory operation. At the same time such economy is accompanied by improved quality because of the provision made for more uniform heating of the various parts of the tire casing, with resulting more uniform cure.

This economy and improved quality is made possible by the provision of additional reinforcing ribs on the interior surface of the bag as described, since such ribs make it possible for the bag to properly shape the tire and maintain it in the proper shape, throughout an extended period of service, even though the bag walls are on the average considerably thinner than has heretofore been considered essential for adequate strength.

The importance of this aspect of the invention will be appreciated from a consideration of the service requirements of curing bags in typical tire factory operations. Thus, as indicated previously, the raw tire casing, before it is shaped with the aid of the curing bag, has the form of a generally flat cylindrical band. In inserting the curing bag into the tire casing, for the purpose of shaping the casing, the raw tire is very much distorted from its original natural shape as constructed on the tire building drum, and in this shaping operation there is also a definite stretching of the casing which places the reinforcing elements of the carcass under some tension. The raw tire casing as shaped in annular toroidal form on the curing bag consequently has a continual tendency to become distorted, and is maintained in the desired shape only by virtue of such supporting action as the curing bag is capable of exerting. The stresses set up in the raw tire casing as a result of the shaping operation frequently lead to distortion of the casing, due to the inability of the bag to support the casing. Such distortions frequently occur during the period in which the bag and casing assembly is being conveyed from the shaping operation to the molding presses, which are commonly located at a point relatively remote from the vacuum shaping operation.

Additionally, after the assembly is inserted in the vulcanizing mold, the curing bag must be capable of holding the tire centered in the mold, and must keep the tire from collapsing under the influence of the molding pressure when the internal air pressure is released from the bag, prior to the introduction of heated vulcanizing fluid into the bag.

If the raw tire becomes appreciably distorted at any of these stages, the result is generally a defective cured tire. Characteristic defects in the finished tire are recognized as having their origin in the failure of the curing bag to adequately support the raw casing. One such commonly observed fault in the finished tire is that known as the "kinked bag" defect. This is characterized by a radial ridge or projection on the inner or band ply of the finished tire, caused by flow of the tire carcass into a void created by an inward buckling or folding of the bag crown in a radial direction. Another such fault is that known as the "crushed bag" defect. This is due to an inward buckling or folding of the bag at the area of the bag just above the tire bead, that is, region 28 of the bag in Fig. 1. Again, the result is a projection on the tire band ply which corresponds with the bag crush.

The difficulty in providing a curing bag having sufficient strength and rigidity to forestall these defects is aggravated by the severe service conditions to which the bag is repeatedly exposed, with consequent continual degradation of the physical properties of the bag material. Repeated exposure of the bag to vulcanizing temperatures and to oxidizing conditions places a severe limitation on the number of times the bag can be reused before it becomes so weak that an excessive number of defective tires are produced. The resulting necessity for periodically replacing the bag represents a substantial item of expense in the manufacture of tires.

Largely contradictory to the foregoing requirement for strength and rigidity is the further requirement that the bag be capable of transmitting heat to the tire casing in the shortest possible time.

The invention provides a means for substantially mitigating the foregoing difficulties by furnishing reinforcement of the bag in the manner described. Thus, by providing the radially extending reinforcing ribs, such as the ribs 30, it has been found in practice that the above-mentioned "kinked bag" and "crushed bag" defects occur only infrequently and the bag can be re-used for a far greater number of turns than would otherwise be possible. Specifically, it has been observed in actual factory practice of the form of the invention shown in Fig. 1, that the curing bag performed satisfactorily at 200 turns, whereas a bag of equivalent wall thickness, without the reinforcing ribs, failed at 12 turns.

This improvement in the performance of the present bag is all the more remarkable when it is considered that the improvement is accompanied by the ability to cure the tire in substantially less time than required with the conventional heavy walled bag. Thus, on 9.00–20 size tires, the form of the invention shown in Fig. 1 permitted a reduction of 20% in the duration of curing cycle. This represents an appreciable economy, and permits greater productivity of the tire molding presses.

Further economy results from the fact that the curing bag constructed according to the invention utilizes a minimum amount of material, because of the relative thinness of the walls thereof. Because it contains less material, the curing bag is also considerably lighter and easier to handle than conventional curing bags, and is capable of being inserted into the tire casing with appreciably less force, and to be removed from cured tire more easily, so that it is not necessarily subjected to such abuse as the conventional bag.

In the modification of the invention shown in Fig. 5, the walls of the curing bag 40 are again made approximately inversely proportional to the thickness of a tire casing with which the bag is to be associated, that is, the crown portion 41 of the bag is relatively thicker than the shoulder portions 42, while the side wall portions 43 are relatively thicker than the shoulder portions 42, and the portions 44 above the beads are relatively thinner than the side wall portions 43. Spaced radially extending reinforcing ribs 45, 46 are provided at the thinner shoulder portions 42 and bead portions 44, respectively, to provide for reinforcement of the bag at such portions without materially decreasing the amount of heat transmitted at such thin portions.

The portions of the bag at the shoulder region 42 and the region 44 above the beads are especially critical in that these areas are particularly vulnerable to the "kinked bag" and "crushed bag" defects. By providing bridging ribs 45, 46 at these areas these defects can be forestalled, even while the wall thickness of the bag at these regions is proportionately reduced to permit more rapid heat transfer.

The modification of the invention shown in Fig. 6 provides for reinforcement of the relatively thin walled bag 47 by means of inwardly projecting evenly spaced spiral ribs 48. This is a particularly advantageous form of the invention since it provides the desired reinforcement in a manner conducive to best circulation of the fluid heating medium, usually hot water, during the vulcanizing operation. Thus, the spiral ribs in a sense define generally circumferential channels, free of radial interruptions, through which the hot water flows easily in its natural circumferential direction. It will be understood that the hot water is commonly introduced continuously during the vulcanization through an inlet stem at one point on the inner diameter of the bag, and withdrawn through a second stem diametrically opposed to the inlet stem, so that the water traces semi-circular paths circumferentially around the bag. The resulting easy flow of water along the surface of the bag is conducive to the most rapid heat transfer.

The forms of the invention shown in Figs. 1 to 4, 5 and 6 are conveniently manufactured by employing the compression molding process described and claimed in the copending application of Jake Hevgeveld, Serial No. 67,430, filed December 27, 1948, and assigned to same assignee as the instant application. Such a molding process involves compression molding the curing bag in the form of two transaxial halves, which are subsequently circumferentially spliced to form the completed curing bag.

It is preferred that the various forms of reinforcing ribs be of such width and so spaced from each other that the ribs do not constitute an undue barrier to rapid and uniform flow of heat through the walls of the bag. To this end, it is preferred that the ribs be at least as thick as they are wide, that is, they should prefedably not be broader than the distance by which they project from the interior surface of the bag. At the same time, the ribs should preferably not be thicker than approximately 1½ times their width, otherwise they are apt to display a tendency to buckle. It is further preferred that the ribs be spaced from each other at the center of the sidewall of the bag by a distance at least two times greater than the width of the ribs.

Having thus described our invention, what we claim and desire to protect by Letters Patent is:

1. A thin walled curing bag comprising an annular toroidal form of extensible resilient material, having an exterior contour corresponding to that of the interior of a pneumatic tire casing, the wall thickness of the bag at the crown portion being greater than the wall thickness at the shoulder portions, the wall thickness at the sidewall portions being greater than at the shoulder portions, and the wall thickness at the bead portions being less than at the sidewall portions, the interior surface of the bag having integral reinforcing ribs projecting therefrom, the said reinforcing ribs being thicker at the shoulder portions and bead portions to provide additional reinforcement at such relatively thinner portions.

2. A thin walled curing bag comprising an annular toroidal form of extensible resilient material, having an exterior contour corresponding to that of the interior of a pneumatic tire casing, the wall thickness of the bag at the crown portion being greater than the wall thickness at the shoulder portions, the wall thickness at the sidewall portions being greater than at the shoulder portions, and the wall thickness at the bead portions being less than at the sidewall portions, the bag having integral reinforcing ribs projecting therefrom at equally spaced points around the interior of the bag and extending radially of the major axis of the bag, the said reinforcing ribs being thicker at said shoulder portions and bead portions to provide additional reinforcement at such relatively thinner portions, and additional interior reinforcing ribs located toward the upper and lower portions of the sidewall and extending circumferentially of the major axis of the bag.

3. A thin walled curing bag comprising an annular toroidal form of extensible resilient material, having an exterior contour corresponding to that of the interior of a pneumatic tire casing, the interior surface of the curing bag being provided with integral inwardly projecting ribs extending radially of the major axis of the bag, said ribs having a definite thickness at the sidewall portions and becoming relatively thicker at the shoulder and bead portions, and becoming relatively thinner and terminating toward the crown and base portions, and additional interior reinforcing ribs located toward the upper and lower portion of the sidewall and extending circumferentially of the major axis of the bag, the said ribs being at least as thick as they are wide, and not thicker than 1½ times their width, and the said radial ribs being spaced from each other at the center of the sidewall of the bag by a distance at least two times greater than the width of the ribs.

4. A thin walled curing bag comprising an annular toroidal form of extensible resilient material having an exterior contour corresponding to that of the interior of a pneumatic tire casing, the wall thickness of the shoulder and bead portions of the said bag being less than the wall thickness of the bag at the crown and sidewall portions, the interior surface of the bag having integral reinforceing ribs projecting therefrom and extending along spaced spiral paths, the said ribs being no wider than they are thick, and being spaced from each other by a distance at least two times greater than the width of the ribs.

5. A thin walled curing bag comprising an annular toroidal form of extensible resilient material, having an exterior contour corresponding to that of the interior of a pneumatic tire casing, the wall thickness of the shoulder and bead portions of the bag being less than the wall thickness of the crown and sidewall portions, the interior surface of the bag being provided with integral inwardly projecting ribs extending radially of the major axis of the bag, said ribs having a definite thickness at the sidewall portions and becoming relatively thicker at the shoulder and bead portions, and becoming relatively thinner and terminating toward the crown and base portions, the said ribs being at least as thick as they are wide, and not thicker than 1½ times their width, and the said ribs being spaced from each other at the center of the sidewall of the bag by a distance at least two times greater than the width of the ribs.

References Cited in the file of this patent

UNITED STATES PATENTS

| Number | Name | Date |
|---|---|---|
| 1,316,276 | Clark et al. | Sept. 16, 1919 |
| 1,642,541 | Ellinwood | Sept. 13, 1927 |
| 1,721,580 | Wersen | July 23, 1929 |
| 2,248,934 | Auzin | July 15, 1941 |